US008447367B2

(12) United States Patent
Wenger

(10) Patent No.: US 8,447,367 B2
(45) Date of Patent: May 21, 2013

(54) PROCESS MEASUREMENT INSTRUMENT ADAPTED FOR WIRELESS COMMUNICATION

(75) Inventor: Fabian Wenger, Göteborg (SE)

(73) Assignee: Rosemount Tank Radar AB, Gothenburg (SE)

( * ) Notice: Subject to any disclaimer, the term of this patent is extended or adjusted under 35 U.S.C. 154(b) by 516 days.

(21) Appl. No.: 11/800,605

(22) Filed: May 7, 2007

(65) Prior Publication Data

US 2008/0278145 A1 Nov. 13, 2008

(51) Int. Cl.
H04M 1/00 (2006.01)
G01F 23/00 (2006.01)
G08B 17/10 (2006.01)

(52) U.S. Cl.
USPC ............ 455/574; 73/290 R; 73/291; 340/618

(58) Field of Classification Search
USPC ................. 455/574; 73/290 R, 291; 340/618
See application file for complete search history.

(56) References Cited

U.S. PATENT DOCUMENTS

| 4,183,007 | A | * | 1/1980 | Baird | ............................. 367/119 |
| 5,111,201 | A | * | 5/1992 | Matsumura et al. | ..... 340/870.38 |
| 5,448,762 | A | * | 9/1995 | Ward | ......................... 455/67.11 |
| 2003/0069051 | A1 | * | 4/2003 | Pretre et al. | .................... 455/572 |
| 2005/0083198 | A1 | | 4/2005 | Bulin et al. | .............. 340/539.22 |
| 2006/0032304 | A1 | | 2/2006 | Miller | .............................. 73/290 |
| 2007/0090945 | A1 | | 4/2007 | Hoogenboom | ............ 340/539.1 |
| 2007/0103324 | A1 | * | 5/2007 | Kosuge et al. | ................ 340/618 |

FOREIGN PATENT DOCUMENTS

| GB | 2 140 553 | 11/1984 |
| GB | 2 410 553 | 3/2005 |
| GB | 2410553 | 8/2005 |

OTHER PUBLICATIONS

International Search Report for PCT/SE2008/050514, dated Aug. 1, 2008.

* cited by examiner

Primary Examiner — Marisol Figueroa
(74) Attorney, Agent, or Firm — Westman, Champlin & Kelly, P.A.

(57) ABSTRACT

A process measurement instrument adapted for wireless communication, comprising a measurement unit (7) arranged to determine a measurement value of a process variable, a memory (21) arranged to store a current measurement value of the process variable, a wireless communication unit (8), arranged to access the current measurement value and communicate the current measurement value over a wireless communication channel according to a protocol with intermittently active communication, and arbitration logic (22), in communication with the measurement unit and the wireless communication unit, and arranged to ensure that active periods of the measurement unit occur when the wireless communication is inactive.

The measurement unit and communication unit are thus able to share information via the common memory, e.g. by sequential read/write access. This avoids the need for simultaneous activity. The invention can be especially advantageous when the instrument is powered by an internal power store, such as a battery, and extend the lifetime of such a power store.

10 Claims, 2 Drawing Sheets

PROCESS MEASUREMENT INSTRUMENT ADAPTED FOR WIRELESS COMMUNICATION

FIELD OF THE INVENTION

The present invention relates to a process measurement instrument adapted for wireless communication.

BACKGROUND OF THE INVENTION

There is currently an industry push for wireless connectivity of field equipment in the process industry, which poses a number of additional challenges.

A process measurement instrument adapted for wireless communication generally includes a measurement unit, responsible for acquiring a measurement of a process variable, e.g. the level of a product in a tank, and a wireless communication unit, responsible for external communication. The instrument is typically driven by an internal power store, such as a battery, with a requirement on minimum lifetime often on the order of several years.

In order to conserve power in such battery-operated devices, and thus extend their lifetime, the measurement unit typically follows an independent duty cycle of activity and sleep mode. At the same time, the wireless communication unit typically operates intermittently, often as a result of complying with a wireless protocol, based on e.g. TDMA. This may result in random overlaps where either none, one or both units are active at the same time during operation.

As a result, the aggregated power consumption may present periods of extremely low power consumption, with both measurement unit and communication unit inactive, and periods of extremely high power consumption, with both measurement unit and communication unit active. Such steeply varying power consumption is not ideal for achieving a long battery life, and requires a very high maximal supply current.

An additional problem is present in instruments that rely on RF and/or microwave transmission for their measurement process. An example of such measurement instruments is a radar level gauge (RLG). In such instruments, there is a potential for mutual electromagnetic interference (EMI) between the RF module (or microwave module) and the wireless communication module when they operate concurrently. Interference can either be transferred within the enclosure/housing of the device or via the environment if the tank does not shield the radiation (e.g. plastic tanks).

Even if the modules operate at different frequencies, they usually have to be integrated in proximity of each other, in order to minimize the form factor e.g. reduce the board area or number of electronics boards. This can result in unreasonably high blocking specifications which require the use of rather expensive discrete RF filters which also degrade receiver performance by insertion loss and noise factor (they are usually arranged preceding any gain stage and have therefore a larger influence on the noise factor).

One option to solve the problem with mutual interference is to arrange for the modules to transmit/receive according to a common time division scheme, where only one module is active at a time. However, this would require some type of synchronous control of operation of both modules by a common control application. From an integration point of view this is not a desirable requirement, since the pace of development and origin of the two modules follow different design paths. For instance, radar level gauging modules are highly specialized measurement instruments, while wireless communication modules follow the rapid, but sometimes erratic, path of evolving standards.

Hence it is preferred to operate the modules each with its separate control application, following an operating scheme or protocol that is optimized separately. This calls for a different approach when trying to address the problems mentioned above.

In addition, the modules need some ways of communicating with each other, as it is the measurement result obtained by the measurement unit that is to be transmitted over the wireless channel. This implies at least some simultaneous operation, at least when transferring the current measurement value from the measurement unit to the wireless communication unit, e.g. a serial link.

SUMMARY OF THE INVENTION

It is therefore an object of the present invention to mitigate at least some of the above mentioned problems, and provide a wireless process measurement instrument that has less accentuated power consumption peaks, and reduced or eliminated electromagnetic interference (EMI).

According to a first aspect of the present invention, this and other objects are achieved by a process measurement instrument adapted for wireless communication, comprising a measurement unit arranged to determine a measurement value of a process variable, the measurement unit having an operation comprising active time periods and inactive time periods, the active time periods having higher power consumption than the inactive time periods. The instrument further comprises a memory arranged to store a current measurement value of the process variable, a wireless communication unit, arranged to access the current measurement value and communicate the current measurement value over a wireless communication channel according to a protocol with intermittently active communication, arbitration logic, in communication with the measurement unit and the wireless communication unit, and arranged to ensure that active periods of the measurement unit occur when the wireless communication is inactive.

According to a second aspect of the present invention, this and other objects are achieved by a method for communicating a measurement value of a process variable from a measurement unit arranged to determine the measurement value. The measurement unit has an operation cycle comprising active time periods and inactive time periods, the active time periods having higher power consumption than the inactive time periods. The method comprises the steps of storing a current measurement value of the process variable, accessing a stored current measurement value, communicating the current measurement value over a wireless communication channel according to a protocol with intermittently active communication, and controlling the measurement unit and the wireless communication to ensure that active periods of the measurement unit occur when the wireless communication is inactive.

The measurement unit and communication unit are thus able to share information via the common memory, e.g. by sequential read/write access. This avoids the need for simultaneous activity. The arbitration logic ensures that the activity of the measurement unit and wireless unit do not coincide, thereby avoiding power consumption spikes and interference.

By avoiding simultaneous activation of communication unit and measurement unit, signal interference and supply noise due to current-voltage spikes can be avoided. This also requires a lower maximum current from the supply.

The invention can be especially advantageous when the instrument is powered by an internal power store, such as a battery, and extend the lifetime of such a power store.

The proposed solution obviously requires that both units have a sufficient portion of inactive periods, to allow interleaving the active periods without an aggregating delay. However, this is typically the case for wireless instruments, as intermittent operation is a useful way to obtain a low power consumption.

The arbitration logic can be adapted to prolong the inactive period (sleep period) of either unit, so that a subsequent active period is delayed until the other unit is inactive. Note that it is sufficient that one of the units tolerates inhibition of its active period. It may be advantageous to delay the active period of the measurement unit, as the wireless unit is typically governed by the timing requirements of a wireless communication protocol. For example, if access to the wireless channel is TDMA based, it may not be possible to influence scheduled time slots.

According to one embodiment, each measurement cycle is on the order of the active period of the communication protocol, so that one measurement cycle can be completed (i.e. one measurement value generated) during each active period of the communication unit. For TDMA, this would be in the order of 1 Hz.

Alternatively, a complete measurement cycle of the measurement unit can be divided over several active periods. This can be necessary e.g. if the measurement unit is unable to complete a measurement cycle between two active cycles of the wireless unit.

The present invention may be used for a wide variety of intermittent measurement instruments, such as wireless pressure transmitters and level gauges.

It is specifically useful for instruments using electromagnetic energy to perform the measurement, such as radar level gauges.

BRIEF DESCRIPTION OF THE DRAWINGS

This and other aspects of the present invention will now be described in more detail, with reference to the appended drawings showing a currently preferred embodiment of the invention.

DETAILED DESCRIPTION OF CURRENTLY PREFERRED EMBODIMENTS

Figure 1:
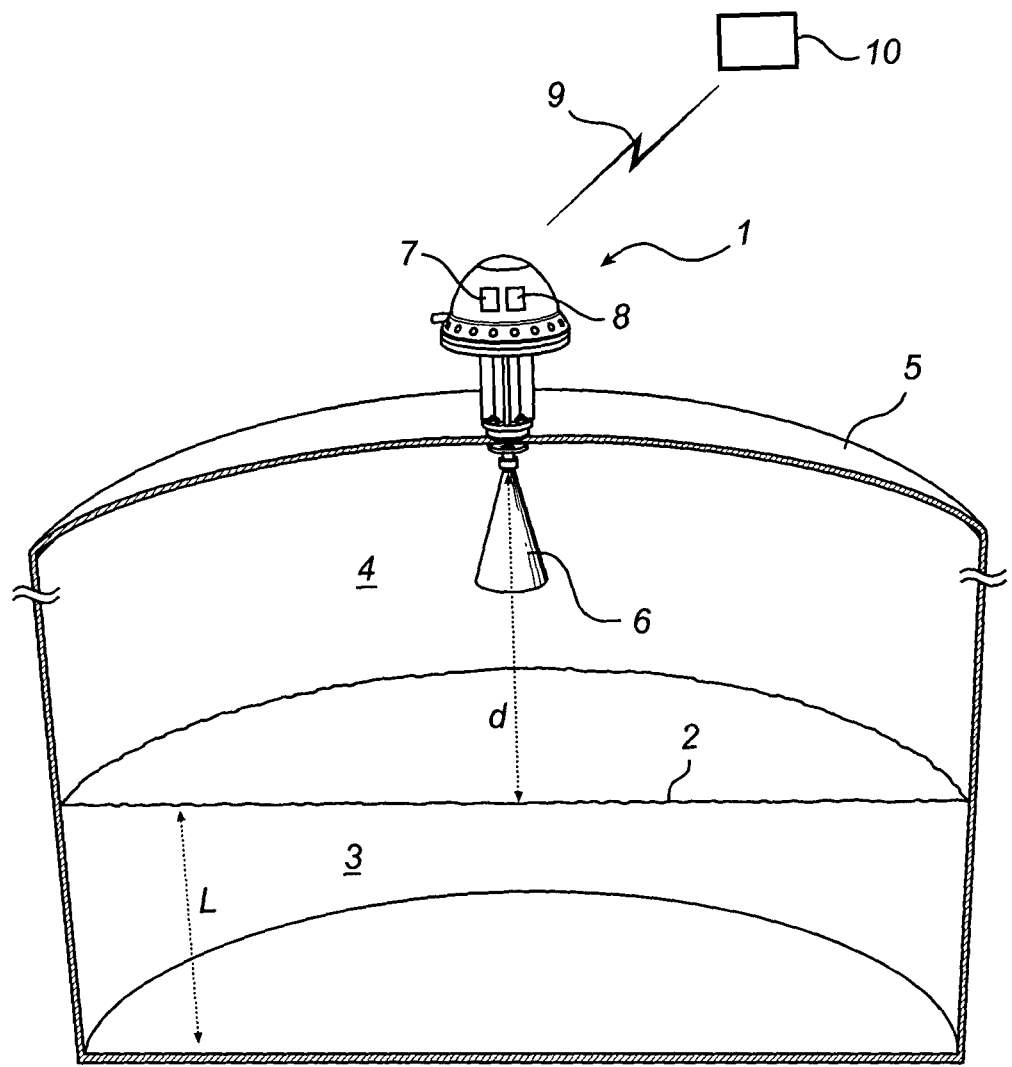
FIG. 1 is a general view of a radar level gauging system (RLG) according to an embodiment of the present invention.

FIG. 1 shows a perspective view of a radar level gauge (RLG) 1, according to an embodiment of the present invention. The gauge 1 is arranged to perform measurements of a process variable in a tank 5, such as the level L of an interface 2 between two (or more) materials 3, 4 in the tank 5. Typically, the first material 3 is a content stored in the tank, e.g. a liquid such as gasoline, but non liquid materials such as grain or pellets may also be detected. The second material 4 is typically air or some other atmosphere present in the tank above the first material 3. The RLG will enable detection of the distance d to the interface 2 in the tank, and this distance may be used to calculate the level L, or some other process variable of interest.

Note that different materials have different impedance, and that the electromagnetic waves will only propagate through some materials in the tank. Typically, therefore, only the level of a first interface is measured, or a second interface if the top material is sufficiently transparent.

The RLG 1 further comprises a microwave emitter/receiver. The emitter/receiver can, as shown in FIG. 1, include a free radiating antenna 6 in the top of the tank, or alternatively the emitter/receiver can include a steel pipe acting as a wave guide, or a transmission probe (e.g. coaxial probe, single probe, or twin probe) extending into the tank.

The RLG 1 further comprises a measurement unit 7 and a communication unit 8. In the illustrated example, the RLG is adapted to communicate over a wireless link 9 with an external control system 10. For this purpose, the communication unit 8 is adapted to communicate with an access point using a suitable wireless protocol.

Figure 2:
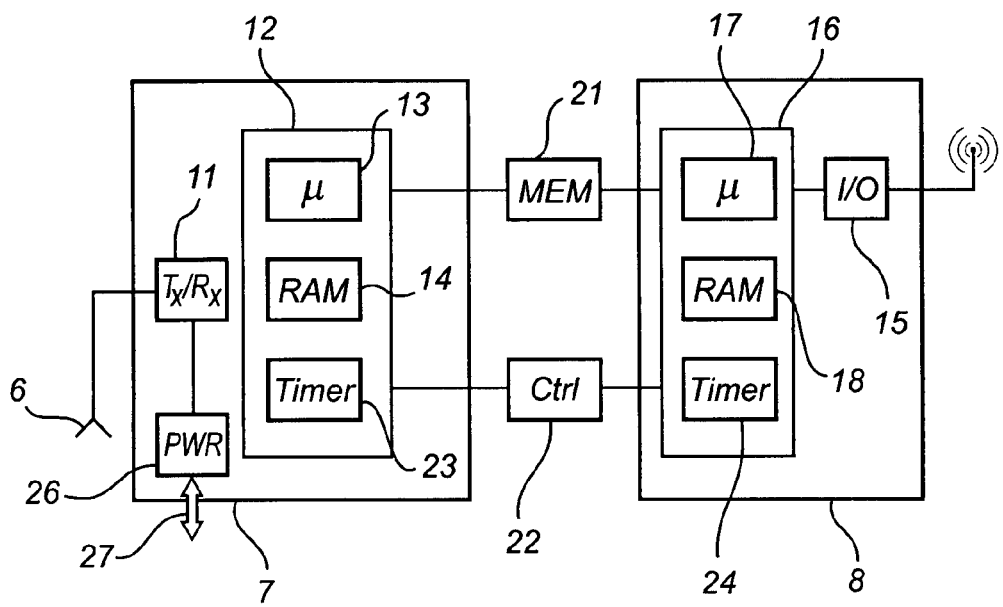
FIG. 2 is a schematic block diagram of the RLG in FIG. 1.

Turning to FIG. 2, showing the RLG 1 in form of a block diagram, the measurement unit 7 includes a transceiver 11 for transmitting and receiving electromagnetic signals, and processing circuitry 12 for controlling the transceiver and for determining a measurement result based on a relation between transmitted and received microwaves. The processing circuitry typically includes a processor 13 and memory 14 for storing software to be executed by the processor.

According to the illustrated embodiment, the communication unit 8 comprises communication circuitry 15 and a transceiver 16. The communication circuitry typically includes a processor 17 and a memory 18 for storing software to be executed by the processor 17. The transceiver 16 may be a GSM modem, arranged to communicate under the GSM standard using time division multiple access (TDMA). Of course, other protocols are equally applicable, such as Zigbee (IEEE 802.15.4), Wireless HART (Zigbee with process industry protocol focus), CDMA (code division multiple access), UMTS (Universal Mobile Telecommunications System), wireless local area network (WLAN), Bluetooth, etc.

In use, measuring unit 7 works intermittently, and performs the measurement during active periods separated by inactive periods. A measurement cycle, i.e. the process to generate one measurement result, may be completed within one such active period, or divided among several active periods. During each measurement cycle, the processing circuitry 12 controls the transceiver 11 to generate and transmit a measurement signal to be transmitted into the tank 5 by the transmitter/receiver 6. This signal can e.g. be a pulsed signal (pulsed level gauging) or a continuous signal with a frequency varying over a certain range (Frequency Modulated Continuous Wave, FMCW), or any other suitable signal modulation for tank gauging. In case of pulsed level gauging, the signals generated by the transceiver 11 can be DC pulses with a length of about 2 ns or less, with a pulse repetition frequency on the order of 1 MHz, and modulated on a carrier of a 4-11 GHz frequency (microwaves). Average output power levels can be in the mW to µW area. The transmitter/receiver 6 acts as an adapter, enabling the signal generated in the transceiver 11 to propagate into the tank 5 as electromagnetic waves, which can be reflected by the surface of the material 3.

A tank signal, i.e. the correlation of the transmitted signal and its echo, or a mix of transmitted and reflected signals, is received by the transceiver via the transmitter/receiver 12, and communicated to the processing circuitry 20. The processing circuitry 20 determines a measurement result based on a relation between the emitted and received waves.

The RLG 1 in FIG. 2 further comprises a memory 21 connected to and accessible from the measurement unit 7 and the communication unit 8 using a suitable internal memory access communication protocol. The memory is provided with necessary control and data area for storing a measurement result from the measurement unit, and to make this result available to the communication unit.

An arbitration logic 22 is arranged to manage memory access by controlling sleep timer processes 23, 24 in the processing circuitry 12 and/or the communication circuitry 15 and/or the transceiver/radar for tank gauging.

The RLG further comprises an internal power store 26, e.g. a battery or similar device. The power store may be rechargeable over a power supply interface 27, e.g. a simple wire or a more elaborate wireless power supply interface.

Figure 3:
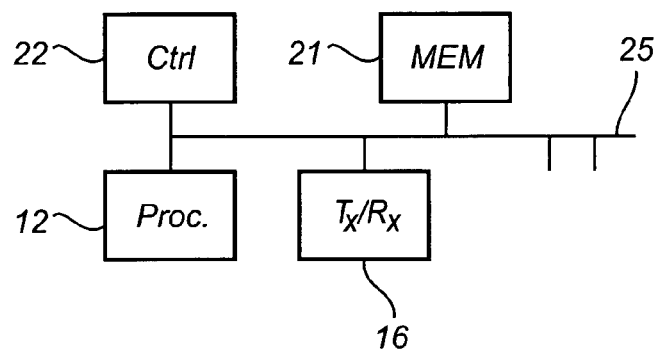
FIG. 3 is a schematic illustration of a chip on silicon realization of the block diagram in FIG. 2.

The memory can be implemented either as a discrete module, e.g. as a dual-port SRAM or non-volatile memory, or be part of an integrated solution, e.g. using a DMA (direct memory access) channel in a system on chip (SoC). Such an integrated solution may include the processing circuitry 12, the communication circuitry 15, the memory 21, and the arbitration logic 22, as illustrated in FIG. 3.

In a SoC implementation, the tank transceiver/radar controlling circuitry 12 and the communication transceiver controlling circuitry 16 would typically share access to a common memory 21 via an internal bus 25 that connects different modules. The arbitration logic 22 would typically be a DMA (discrete memory access) controller that gives each processing module access to the memory 21 according to a certain schedule, e.g. Round-Robin among the processing modules. The memory 22 could then contain the measurements values that are transmitted asynchronously as well as state information that is shared with other modules (e.g. active, sleep info).

During operation, the arbitration logic 22 ensures that the measurement unit 7 and communication unit 8 alternatingly are active, and access the memory one at a time. More specifically, the arbitration logic 22 controls the sleep timer processes 23, 24 to keep one of the measurement unit 7 and the communication unit 8 in an inactive condition (sleep mode) until the other unit has completed an active period. In cases where the communication protocol relies on specific timing, such as when the communication unit 8 is arranged to communicate using a TDMA protocol, the sleep periods of the communication unit 8 can not be controlled by the arbitration logic. Instead, the arbitration logic controls the sleep process 23 of the measurement unit 7 in accordance with the sleep periods of the communication unit 8.

Figure 4:
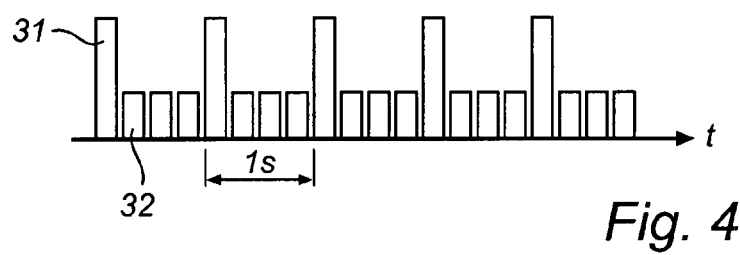
FIG. 4 is a time line illustrating arbitration according to an embodiment of the present invention.

A simple arbitration scheme is illustrated in FIG. 4. Here, each communication cycle, i.e. active period of the wireless communication unit 8, is denoted 31, and has a duration sufficient to allocated TDMA communication slots, here illustrated as one communication slot per communication cycle. As indicated in FIG. 3, the repetition frequency of such cycles can be in the order of 1 Hz. Between each communication cycle 31, the measurement unit 7 is active, and at least one complete active period 32 of the measurement unit take place between communication cycles 31.

For a radar level gauge, the repetition frequency of the measurement unit 7 may be in the order of 10 Hz for line-powered devices, i.e. there will be around ten active periods 32, each including a complete measurement cycle, between two consecutive communication cycles 31. However, it could be as long as once per 10 minutes for battery-powered instruments to prolong battery life. In FIG. 3, only three active periods 32 are shown for reasons of clarity.

At least once between two consecutive communication cycles 31, and preferably once for each active period 32, the measurement unit gains access to the memory 21, and stores a measurement result in the memory 21. During the communication cycle 31, the communication unit 8 gains access to the memory 21, and reads the stored result.

In principle, it would be sufficient to perform one measurement, i.e. one measurement cycle, between two consecutive communication cycles 31. However, there may be reasons for performing several measurements between the communication cycles 31, e.g. if the communication protocol allows to send the x latest measurements to control level changes that are higher than the communication update rate. This saves power by bundling measurements and reducing total protocol overhead. Further, several measurements may be used to determine an average measurement result, which might reduce the standard deviation of the generated result.

It should also be noted that the measurement unit 7 and/or communication unit 8 not necessarily access the memory 21 during each active period. On the contrary, depending on the repetition frequency required by the communication unit 8, and the time required by the measurement unit 7 to complete one complete measurement cycle, some instruments may require several active periods to complete one measurement. Likewise, depending on the communication protocol, it is possible that the communication unit requires several active periods (i.e. several communication cycles 31) to complete the communication of a measurement result.

The person skilled in the art realizes that the present invention by no means is limited to the preferred embodiments described above. On the contrary, many modifications and variations are possible within the scope of the appended claims. For example, although an embodiment of the invention has been described with reference to a radar level gauge, this is only an example, and many other process instruments, such as pressure gauges and other gauges, can advantageously be provided with an embodiment of the present invention.

What is claimed is:

1. A process measurement instrument configured for wireless communication, comprising:
    a measurement unit configured to determine a measurement value of a filling level of a product in a tank,
    said measurement unit having an operation comprising active time periods and inactive time periods, said active time periods having higher power consumption than said inactive time periods,
    a memory configured to store a current measurement value of said filling level,
    a wireless communication unit, configured to access said current measurement value and communicate said current measurement value over a wireless communication channel according to a communication protocol,
    wherein said communication protocol is a time division multiple access (TDMA) protocol, and relies on specific timing controlled externally of said process measurement instrument, wherein said wireless communication unit has active periods during TDMA communication slots allocated by said communication protocol, and inactive periods between said active periods, and
    arbitration logic, in communication with said measurement unit and said wireless communication unit,
    wherein said arbitration logic controls the active periods of the measurement unit to occur between active periods of said wireless communication unit for avoiding power consumption spikes and interference in said process measurement instrument.

2. A process measurement instrument according to claim 1, wherein a measurement cycle of said measurement unit is divided over several active periods.

3. A process measurement instrument according to claim 1, wherein said instrument further comprises an internal power store.

4. A process measurement instrument according to claim 1, wherein said instrument further comprises a wireless interface for power supply.

5. A process measurement instrument according to claim 1, wherein said measurement unit comprises a transceiver for transmission of electromagnetic waves during said active periods.

6. A process measurement instrument according to claim 1, wherein said arbitration logic is configured to prolong an inactive period of said measurement unit, so as to delay a subsequent active period until the wireless communication unit is inactive.

7. A process measurement instrument according to claim 1, configured to determine the level of a product in a tank, comprising
- a transceiver for transmitting and receiving electromagnetic signals,
- a propagation device configured to allow a transmitted signal to propagate towards said surface, and to return a reflected signal to the transceiver, and processing circuitry for determining said measurement value based on a relationship between said transmitted signal and said received signal.

8. A method for communicating a measurement value of a filling level of a tank from a measurement unit configured to transmit electromagnetic signals, receive a reflected signal from said tank, and determine said measurement value based on a relationship between a transmitted signal and a received signal, said measurement unit having an operation comprising active time periods and inactive time periods said active time periods having higher power consumption than said inactive time periods, said method comprising the steps of:
- storing a current measurement value of said filling level,
- accessing a stored current measurement value,
- communicating said current measurement value by means of a communication unit over a wireless communication channel according to a communication protocol with intermittently active communication,
- wherein said communication protocol is a time division multiple access (TDMA) protocol and relies on specific timing controlled externally of said process measurement instrument, wherein said wireless communication unit has active periods during TDMA communication slots allocated by said communication protocol, and inactive periods between said active periods, and
- controlling the active periods of the measurement unit to occur between said active periods of said wireless communication unit for avoiding power consumption spikes and interference in said process measurement instrument.

9. The method according to claim 8, wherein a measurement cycle of said measurement unit is divided over several active periods.

10. The method according to claim 8, wherein said step of controlling comprises prolonging an inactive period of said measurement unit, so as to delay a subsequent active period until the wireless communication unit is inactive.

* * * * *